July 21, 1953 — A. B. POSCHEL — 2,646,379
METHOD OF DECORATING AN UNCURED RUBBER ARTICLE
Filed Nov. 8, 1949
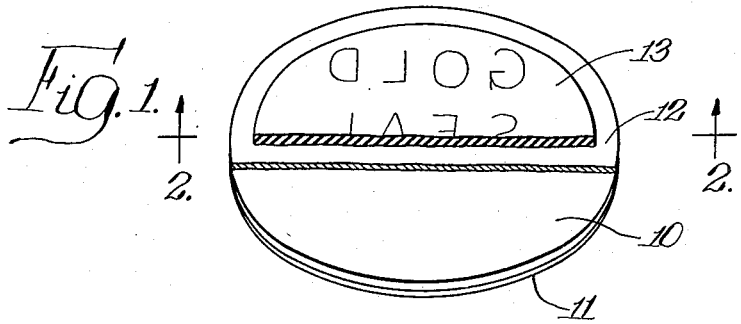
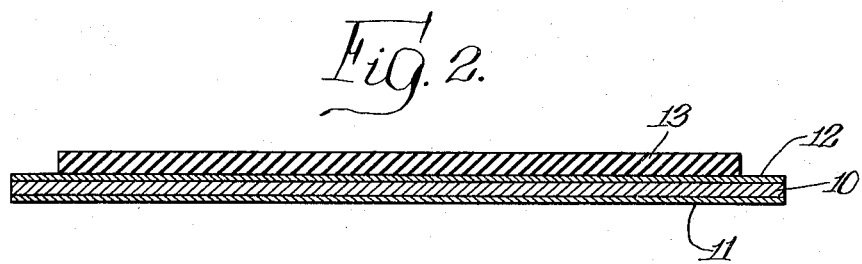
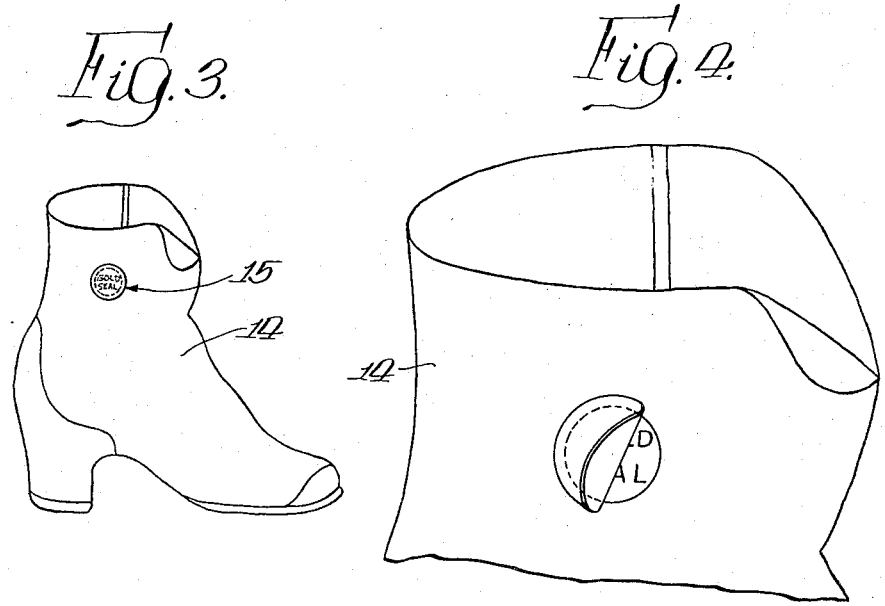
INVENTOR.
Alfred B. Poschel,
BY
Davis, Lindsey, Hibben + Noyes
Attys.

Patented July 21, 1953

2,646,379

UNITED STATES PATENT OFFICE 2,646,379

METHOD OF DECORATING AN UNCURED RUBBER ARTICLE

Alfred B. Poschel, Chicago, Ill., assignor to The Meyercord Co., Chicago, Ill., a corporation of Illinois Application November 8, 1949, Serial No. 126,114

6 Claims. (Cl. 154—95)

1

This invention relates to a novel decalcomania transfer and more particularly to a decalcomania especially adapted for use on rubber products and the like.

Heretofore, rubber goods have been decorated to a large extent by direct printing, stenciling, or stamping methods. However, decalcomania transfers have also been proposed in the prior art in which the transferable design layer is formed from a thin elastic rubber film which can be affixed to an uncured rubber article and permanently secured upon vulcanization of the article. For example, my prior U. S. Patent 2,138,866 discloses a rubber decalcomania of the foregoing type in which a rubber design film is disposed on a paper backing with a conventional coating of water soluble gum disposed between the paper backing and the rubber design layer. This decalcomania may be applied by moistening the decalcomania, pressing the rubber design film thereof against the surface of an uncured rubber article, and stripping or sliding off the paper backing which has been released as a result of the softening of the water soluble gum layer. The rubber article with the rubber design film in place thereon may then be subjected to vulcanization.

However, it has been found that in certain cases rubber goods may develop pronounced spots or stains when contacted with water prior to completion of the manufacturing and curing steps. Such spotting is highly objectionable in the case of many types of rubber goods, e. g. rubber footwear, where the finished appearance of the article is extremely important from the point of view of sales appeal and public acceptance. Consequently, it is necessary to employ every precaution to prevent such rubber goods from coming into contact with water during vulcanization and the fabricating steps preceding vulcanization. It will be apparent that under such circumstances a decalcomania or decorative transfer comprising a water releasable design layer cannot be employed with satisfactory results.

Moreover, in the case of rubber goods of the aforementioned character, particularly footwear such as rubber overshoes, galoshes, boots, and the like, it is common practice to apply a gloss-imparting varnish or lacquer over the entire exterior surface in order to obtain the customary shiny finish on articles of this nature. I have found that the decalcomania transfers heretofore available for use on rubber goods are not entirely satisfactory where it is necessary or desirable to varnish the articles of rubber goods. If a decalcomania of the previously known types is applied to a rubber article and the carrier sheet comprising a conventional paper backing is left in place during the varnishing step, I have found that the backing paper is readily penetrated by the fluid constituents of the rubber varnish with the result that the underlying rubber design layer tends to adhere or stick to the paper backing thereby preventing or seriously impairing the removal of the latter or causing mutilation of the design layer when the backing is removed.

Accordingly, a primary object of my invention is to provide a novel decalcomania transfer for use on rubber goods without the use of water whereby objectionable spotting and discoloration of the rubber goods is avoided.

Another object of my invention is to provide a novel decalcomania transfer adapted for application to uncured rubber goods and of such construction that the goods can thereafter be varnished and cured without interfering with the proper manipulation of the decalcomania and without impairing the transfer design.

An additional object of the invention is to provide a novel method of decorating or ornamenting an uncured rubber article.

Other objects and advantages of my invention will become apparent from the subsequent detailed description taken in connection with the accompanying drawing wherein:

Fig. 1 is an enlarged perspective view of a decalcomania transfer embodying the features of the present invention, portions of the various layers of the transfer being broken away to illustrate the laminar construction;

Fig. 2 is a cross-sectional view taken substantially along the line 2—2 of Fig. 1, the layers being shown in exaggerated thickness for the sake of clarity;

Fig. 3 is a perspective view of a woman's galosh showing an initial stage in the application thereto of a decalcomania such as illustrated in Figs. 1 and 2; and Fig. 4 is an enlarged fragmentary perspective view of the upper portion of the galosh showing a final stage in the application of the decalcomania.

Referring now to Figs. 1 and 2, the decalcomania comprises a carrier or base in the form of a paper backing 10, a sealer coating covering preferably both surfaces of the paper backing as indicated at 11 and 12, and a transferable rubber design film 13 disposed against one of the coated sides 12 of the paper backing 10. As hereinafter described in detail, the carrier layer of my decalcomania may be dry-stripped from the design layer, i. e. the paper backing 10 may be stripped or released from the rubber design film 13 without the use of water or other solvent for effecting such release. In addition, the sealer coatings 11 and 12 are in the nature of a varnish-resistant surface sizing which prevents the penetration of varnish constituents during application of a gloss-imparting varnish to the rubber goods to which the decalcomania is affixed.

The transfer design film 13 being composed of uncured rubber may be pressed into contact with the surface of the uncured rubber article, the latter being sufficiently tacky in its normal uncured state to retain the decalcomania in place until the design layer is permanently bonded to the rubber article by means hereinafter described. With the decalcomania thus temporarily held in place, the entire outer surface of the rubber article may be coated with a suitable gloss-imparting varnish or lacquer, the varnish also being coated over the exposed outer side of the decalcomania. An important feature of my invention is the provision of the surface sizing or sealer coatings 11 and 12 on the opposite sides of the paper backing 10 which coatings substantially preclude penetration of the solvent or plasticizing constituents of the rubber varnish through the paper thereby avoiding any tendency for the rubber design film 13 to stick or become bonded to the paper backing 10 so as to prevent ready separation of the backing after vulcanization.

Although in the embodiment of the invention illustrated in the drawing I have shown a sealer coating on both sides of the paper backing 10, it is within the scope of my invention to employ a paper backing having only one side seal-coated. For example, the sealer coating 12 could be omitted with the rubber design film 13 being disposed directly against the paper backing 10. In such case the outermost sealer coating 11 would function to render the backing substantially impermeable to rubber varnish constituents. However, the provision of the sealer coating on both sides of the paper backing 10 is preferred since maximum protection against penetration of the rubber varnish is thereby realized, and in addition the innermost sealer coating layer 12 performs the additional function of providing a readily separable surface from which the design film 13 may be easily released by dry stripping, as hereinafter described more specifically.

Gloss-imparting varnishes for use on black rubber footwear commonly comprise a sulfurized boiled linseed oil thinned with turpentine. Other constituents such as litharge or colored pigments may also be present in the varnish if desired. In certain cases, varnishes or lacquers composed of cellulose nitrate or cellulose acetate in suitable solvents may also be employed as an overdressing to impart gloss to the surfaces of such rubber articles as raincoats, toy balls, etc. Varnishes or lacquers of this character contain a sufficient quantity of plasticizer to keep the dried glossy coating non-brittle, pliable, and elastic yet without being tacky.

The surface sizing or sealer coatings 11 and 12 which render the paper backing 10 substantially impermeable to such varnishes may comprise an adhesive substance with or without an added filler. For example, starch, casein, glue, an alkali metal silicate, or the like may be used together, if desired, with clay, talc or other filler. For purposes of the present invention, I have found that an alkali metal silicate such as sodium silicate or water glass is the preferred material for the sealer coats 11 and 12. I may also add to the sodium silicate a quantity of coating clay, starch, or the like as a filler or extended in order to reduce the quantity of silicate needed. Another type of sealer coating which may be employed comprises solid polymers of ethylene commonly referred to as polyethylene. The sealer coating or sizing composition may be applied to the paper backing by means of rollers or by the use of an air brush or by other conventional means well known in the paper coating art. After drying, the coated paper is substantially impermeable to such constituents as linseed oil, turpentine, and other solvent and plasticizing components of the usual gloss-imparting rubber varnishes. Moreover, in the case of a sealer coating comprising polyethylene or an alkali metal silicate such as sodium silicate, the dried coating provides a smooth hard non-tacky surface which is readily separable or removable from contact with rubber. Thus, the sealer coating 12 in the drawing assists in effecting release or removal of the paper backing 10 by reason of its property of not adhering or sticking tenaciously to a rubber surface such as the rubber design film 13.

In Fig. 3 there is shown an article of rubber footwear comprising a woman's galosh 14 which is in uncured condition and which has disposed thereon a decalcomania transfer 15 of the type shown in Figs. 1 and 2. The decalcomania 15 is applied by pressing the rubber design film 13 thereof firmly against the tacky surface of the uncured rubber article 14, as mentioned above, with the coated paper backing sheet outermost. It is important that the peripheral edges of the outermost backing sheet be pressed securely into tight sealing engagement around the entire decalcomania in order to minimize the possibility of varnish or lacquer seeping or leaking around the edges of the decalcomania and thus coming into contact with the rubber design layer. When the decalcomania 15 is thus initially applied, as seen in Fig. 3, the article of footwear 14 may then be coated, usually by a simple dipping operation, with the gloss-imparting varnish. Thus, the varnish is applied over the entire surface of the rubber article and also over the outer exposed surface of the decalcomania 15. However, because of the impermeable sealer coatings the paper backing of the decalcomania is thereby resistant to penetration of the varnish constituents, and undesirable sticking of the rubber design layer to the paper backing after vulcanization is avoided.

Immediately after the application of the gloss-imparting varnish, the rubber article is subjected to vulcanization or curing at an elevated temperature according to any of the well known techniques in the rubber art. As a result of the vulcanizing operation, the rubber design layer becomes an integral part of the surface of the rubber article 14. After vulcanization has been completed I have found that the backing paper is substantially released from the article and, as seen in Fig. 4, is often curled away or partially detached from the rubber article so that the slightest stretching or deflection of the rubber material will serve to displace the backing sheet.

In most instances, articles of rubber footwear such as the galosh shown in Fig. 3 are mounted on suitable holders or racks for varnishing and vulcanization. With such practice the mere removal of the vulcanized article from the holder or rack is ordinarily sufficient to cause the released paper backing to be completely displaced from the rubber article. However, in the event that the simple manipulation of the article of footwear during its removal from the rack does not effect complete removal of the backing sheet, the sheet may then be readily stripped from the article by hand.

During the vulcanization operation at elevated temperatures the normally tacky condition of both the uncured rubber article and the uncured rubber design layer is eliminated and a smooth, non-tacky, integrated surface results thereby destroying the bond between the paper backing 10 and the underlying rubber surface. In addition, the provision of the sealer coating 12, comprising preferably sodium silicate or the like, between the paper backing 10 and the design film 13 also assists in effecting release of the paper backing after vulcanization, as hereinbefore described. As a result, the backing sheet 10 either falls off or curls away and is so loosely held that it may be removed from the vulcanized rubber article, as above described, with only slight effort.

The rubber design film 13 may be printed by conventional screen printing or rotogravure techniques directly onto one of the coated surfaces of the paper backing. The design film may comprise a single layer of rubber or, particularly in the case of a multi-colored design, it may be composed of a plurality of superimposed layers. For example, the design film 13 illustrated in the drawing may be composed of three different colored layers including a white background or base layer, a black layer, and a yellow outline layer forming a peripheral design against the black background and outlining the printed indicia "Gold Seal" in black. A typical basic ink composition which I have found to be satisfactory for forming the rubber design layer by a screen printing technique is as follows:

9 lbs. natural crepe rubber
6 gals. dipentene
400 cc. "Bondogen" (a commercial plasticizer or breakdown aid comprising a sulfonated petroleum distillate residue)

The foregoing clear solution comprising the basic ink composition is mixed in a mill with a suitable pigment to obtain the desired ink color. For example, for a yellow ink, I composite 2 gals. of the above-described solution with 3 lbs. cadmium yellow, 3 lbs. zinc yellow, and 3 lbs. chrome yellow. For a black ink, I composite 1½ gals. of the same basic solution with 5 lbs. carbon black and ½ lb. blue pigment. For a white ink, such as is commonly used as a background for a multi-colored printed design as described above, I composite 2½ gals. of the above described clear solution with 10 lbs. titanium dioxide. In each case an additional quantity of dipentene may be added as needed to thin the ink to the desired viscosity.

In the case of an ink composition for use in a rotogravure printing method, the same formulas may be followed with the exception that a faster drying solvent such as xylol is used instead of dipentene.

Just prior to use of the rubber ink composition in printing the design film, a suitable vulcanizing composition is incorporated in the ink. For example, I have found that the following vulcanizer formula gives good results:

| | Grams |
|---|---|
| "Captax" (mercaptobenzthiazole) | 200 |
| Sulfur | 300 |
| Stearic acid | 200 |

A solution of the foregoing ingredients in a small quantity of pine oil may be added to the colored ink composition to the extent of from about 3 to about 5% by volume. Smaller amounts of vulcanizer may be used in some cases.

Rubber design films formed from ink compositions of the foregoing character may be integrated with the surface of a rubber article by relatively moderate vulcanizing conditions, e. g. at a temperature of 280° F. for two hours. Although the aforementioned ink compositions contain natural rubber, it is also contemplated that synthetic rubber design films may be utilized when feasible or expedient.

Although only one specific embodiment of the invention has been described in detail and shown in the drawing, it will be understood that various modifications may be employed without departing from the scope of the invention as defined in the appended claims.

I claim:

1. A method of decorating an uncured rubber article by means of a decalcomania transfer including a thin uncured rubber design film supported on a releasable backing having a coating of a varnish-resistant sealer thereon, said film being sufficiently thin so as to be non-self-sustaining in the absence of said backing, said method comprising the steps of pressing said design film against the tacky surface of the uncured rubber article with the backing outermost, applying a gloss-imparting varnish to the article and to the exposed outer surface of the backing, said sealer coating preventing penetration of the varnish through said backing to said design film, and vulcanizing the article whereby to integrate the thin design film with the surface of the article for providing a substantially smooth uniform coplanar decorated surface and whereby simultaneously to effect substantially complete release of said backing from the decorated surface.

2. The method of claim 1 further characterized in that said coating comprises an alkali metal silicate.

3. The method of claim 1 further characterized in that said coating comprises sodium silicate.

4. A method of decorating an uncured rubber article by means of a decalcomania transfer including a thin uncured rubber design film supported on a releasable paper backing with both surfaces of the backing coated with a varnish-resistant sealer coating, said film being sufficiently thin so as to be non-self-sustaining in the absence of said backing, said method comprising the steps of applying said design film against the tacky surface of the uncured rubber article and pressing the peripheral edges of the backing into tight sealing contact with the article whereby to prevent leakage of fluid under the edges of the film during a subsequent varnishing step, applying a gloss-imparting rubber varnish to the article and over the outermost surface of the paper backing, said sealer coating preventing penetration of the varnish through said backing to said design film, and subsequently vulcanizing the article whereby to integrate the thin design film with the surface of the article for providing a substantially smooth uniform coplanar decorated surface and whereby simultaneously to effect substantially complete release of said backing from the decorated surface.

5. The method of claim 4 further characterized in that said coating comprises an alkali metal silicate.

6. The method of claim 4 further characterized in that said coating comprises sodium silicate.

ALFRED B. POSCHEL.

References Cited in the file of this patent

UNITED STATES PATENTS

| Number | Name | Date |
|---|---|---|
| 1,496,753 | Burkley | June 3, 1924 |
| 1,597,301 | Sulberger | Aug. 24, 1926 |
| 1,634,710 | Crowell | July 5, 1927 |
| 1,667,854 | Grimm | May 1, 1928 |
| 1,928,192 | Walker | Sept. 26, 1933 |
| 2,016,312 | Bodle | Oct. 8, 1935 |
| 2,092,928 | Moody et al. | Sept. 14, 1937 |
| 2,169,062 | Way | Aug. 8, 1939 |
| 2,188,866 | Poschel | Jan. 30, 1940 |
| 2,231,083 | Moody et al. | Feb. 11, 1941 |
| 2,416,844 | Reese | Mar. 4, 1947 |

FOREIGN PATENTS

| Number | Country | Date |
|---|---|---|
| 473,153 | Great Britain | Oct. 7, 1937 |

OTHER REFERENCES

Vail, Silicates of Soda, Bulletin 57, Philadelphia Quartz Co., page 4.